(12) United States Patent
Lee et al.

(10) Patent No.: US 12,095,070 B2
(45) Date of Patent: Sep. 17, 2024

(54) SECONDARY BATTERY FORMATION METHOD

(71) Applicant: LG ENERGY SOLUTION, LTD., Seoul (KR)

(72) Inventors: Jung Mi Lee, Daejeon (KR); Nak Gi Sung, Daejeon (KR); Joon Sung Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 655 days.

(21) Appl. No.: 17/417,598

(22) PCT Filed: Sep. 9, 2020

(86) PCT No.: PCT/KR2020/012148
§ 371 (c)(1),
(2) Date: Jun. 23, 2021

(87) PCT Pub. No.: WO2021/101041
PCT Pub. Date: May 27, 2021

(65) Prior Publication Data
US 2022/0149344 A1 May 12, 2022

(30) Foreign Application Priority Data

Nov. 19, 2019 (KR) .................. 10-2019-0148296

(51) Int. Cl.
*H01M 4/04* (2006.01)
*H01M 10/44* (2006.01)

(52) U.S. Cl.
CPC ....... *H01M 4/0447* (2013.01); *H01M 10/446* (2013.01)

(58) Field of Classification Search
CPC .................. H01M 4/0447; H01M 10/446
(Continued)

(56) References Cited

U.S. PATENT DOCUMENTS

| 10,794,960 B2 | 10/2020 | Kim et al. |
| 2016/0268648 A1 | 9/2016 | Ueno et al. |
| 2020/0036007 A1 | 1/2020 | Kwon et al. |

FOREIGN PATENT DOCUMENTS

| CN | 105706287 A | 6/2016 |
| CN | 106797008 A | 5/2017 |

(Continued)

OTHER PUBLICATIONS

International Search Report (PCT/ISA/210) issued in PCT/KR2020/012148 mailed on Jan. 6, 2021.

(Continued)

*Primary Examiner* — James M Erwin
(74) *Attorney, Agent, or Firm* — Birch, Stewart, Kolasch & Birch, LLP

(57) ABSTRACT

The present invention comprises: a pre-aging step for aging, at room temperature, a secondary battery comprising a cathode including a cathode active material, an anode including an anode active material, a separator interposed between the cathode and the anode, and an electrolyte (S100); a first charging step for primarily charging the pre-aged secondary battery to an SOC of the secondary battery of 60% or higher (S200); a high-temperature aging step for aging the primarily charged secondary battery at a high temperature (S300); and a room-temperature aging step for aging the high-temperature aged secondary battery at room temperature (S400), wherein the room-temperature aging step comprises a resetting process for charging the secondary battery to the same SOC as in the first charging step.

11 Claims, 3 Drawing Sheets

(58) Field of Classification Search
USPC .......................................................... 429/52
See application file for complete search history.

(56) References Cited

FOREIGN PATENT DOCUMENTS

| | | | |
|---|---|---|---|
| CN | 108780127 A | | 11/2018 |
| CN | 109417191 A | | 3/2019 |
| CN | 109659640 A | * | 4/2019 |
| JP | 2012-38463 A | | 2/2012 |
| JP | 2014-35877 A | | 2/2014 |
| JP | 2015-90806 A | | 5/2015 |
| JP | 2015-95332 A | | 5/2015 |
| JP | 2015-153484 A | | 8/2015 |
| JP | 2017-22067 A | | 1/2017 |
| JP | 2017-139107 A | | 8/2017 |
| JP | 2019-160391 A | | 9/2019 |
| KR | 10-2004-0110331 A | | 12/2004 |
| KR | 10-2011-0033640 A | | 3/2011 |
| KR | 10-2014-0139356 A | | 12/2014 |
| KR | 10-2014-0139357 A | | 12/2014 |
| KR | 10-2015-0031018 A | | 3/2015 |
| KR | 10-2016-0065967 A | | 6/2016 |
| KR | 10-2018-0042675 A | | 4/2018 |
| KR | 10-2018-0080914 A | | 7/2018 |
| KR | 10-2018-0081009 A | | 7/2018 |

OTHER PUBLICATIONS

Japanese Notice of Reasons for Refusal for Japanese Application No. 2021-538094, dated Jul. 26, 2022, with an English translation.

* cited by examiner

[FIG. 1]
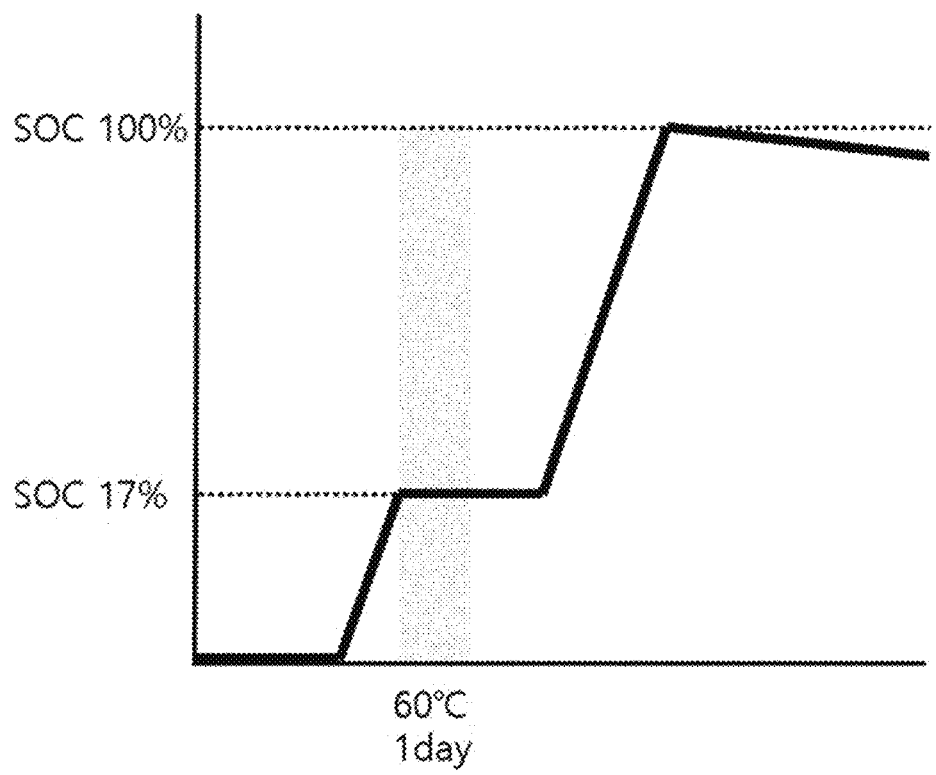
CONVENTIONAL ART

[FIG. 2]
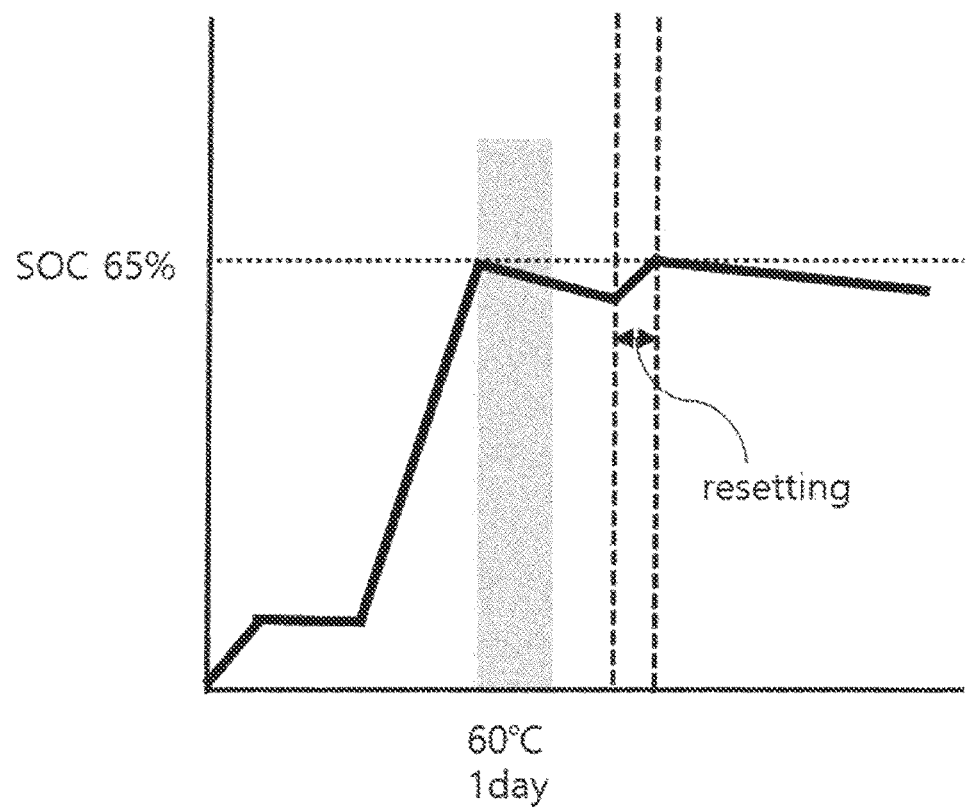

[FIG. 3]
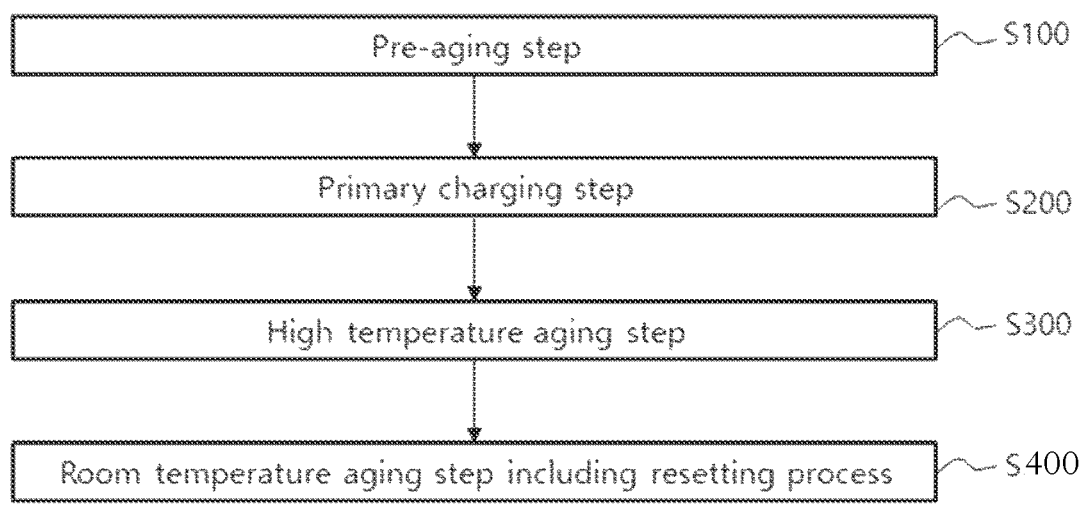

SECONDARY BATTERY FORMATION METHOD

TECHNICAL FIELD

This application claims the benefit of priority based on Korean Patent Application No. 10-2019-0148296, filed on Nov. 19, 2019, and the entire contents of the Korean patent application are incorporated herein by reference.

The present invention relates to a method for activating a secondary battery, and more particularly, to a method of activating a secondary battery having improved detection power of a low voltage defect by reducing the deviation of a voltage drop amount of a good product when detecting a low voltage defect.

BACKGROUND ART

In general, a secondary battery, unlike a primary battery that cannot be charged, means a battery that can be charged and discharged, and is widely used in electronic devices such as mobile phones, notebook computers, camcorders, or electric vehicles. In particular, the lithium secondary battery has a larger capacity than a nickel-cadmium battery or a nickel-metal hydride battery, and because the energy density per unit weight is high, the degree of utilization thereof is rapidly increasing.

The lithium secondary battery mainly uses a lithium-based oxide and a carbon material as a positive electrode active material and a negative electrode active material, respectively. The lithium secondary battery includes an electrode assembly, in which a positive electrode plate and a negative electrode plate coated with the positive electrode active material and the negative electrode active material, respectively, are disposed with a separator therebetween, and an exterior material that seals and stores the electrode assembly together with the electrolyte. Meanwhile, the lithium secondary battery may be classified into a can-type secondary battery in which the electrode assembly is embedded in a metal can and a pouch-type secondary battery in which the electrode assembly is embedded in a pouch of an aluminum laminate sheet, depending on the shape of the battery case.

A secondary battery is generally manufactured through a process in which a liquid electrolyte is injected while the electrode assembly is stored in the battery case, and the battery case is sealed.

In the lithium secondary battery, various types of defects may occur due to various causes during a manufacturing process or use. In particular, some of secondary batteries that have been manufactured have a phenomenon of exhibiting a voltage drop behavior over a self-discharge rate, and this phenomenon is called low voltage.

The low voltage failure phenomenon of the secondary battery is often due to a foreign metal material located therein. In particular, when a metal foreign material such as iron or copper is present in the positive electrode plate of the secondary battery, the metal foreign material may grow as a dendrite at the negative electrode. In addition, such a dendrite causes an internal short circuit of the secondary battery, which may cause failure or damage of the secondary battery or, in severe cases, ignition.

On the other hand, the above-mentioned metal-induced low-voltage defects appear as an increase in the relative voltage drop, and low-voltage defects are detected through the aging process during the activation process of the secondary battery.

FIG. 1 is a schematic view showing process conditions for each step of a conventional activation process. Referring to this, conventionally, an activation process was performed in a manner that a pre-aged battery is primarily charged in the range of SOC 10-40%, the primary charged secondary battery is aged at a high temperature, the secondary battery aged at a high temperature is secondary charged, and then aged at room temperature. Further, the OCV is measured at two selected time points among the room temperature aging process, and the change value (voltage drop) of the OCV is compared with the reference value. Then low voltage defects have been selected in such a way that a battery having the voltage drop amount below the reference value is judged as a good product.

However, the method described above has a region in which the voltage drop amount of a good product and the voltage drop amount of a bad product appear at the same level, so it is difficult to accurately select a low voltage defect. Therefore, in order to improve the detection power of low-voltage defects, it is necessary to develop a technology for reducing the voltage drop amount and the deviation of good products.

DISCLOSURE

Technical Problem

The present invention is proposed to solve the above problems, and an object of the present invention is to provide a method of activating a secondary battery that significantly improves a detection power of a low voltage defect by reducing a voltage drop amount of a good product and improving its dispersion.

Other objects and advantages of the present invention can be understood by the following description, and will be more clearly understood by the embodiments of the present invention. It will also be readily appreciated that the objects and advantages of the invention may be realized by the means and combinations thereof indicated in the claims.

Technical Solution

A method for activating a secondary battery according to the present invention includes: a pre-aging step of aging a secondary battery including a positive electrode containing a positive electrode active material, a negative electrode containing a negative electrode active material, a separator interposed between the positive electrode and the negative electrode, and an electrolyte, at a room temperature (S100); a primary charging step of charging the pre-aged secondary battery to 60% or more of a secondary battery capacity (SOC) (S200); a high temperature aging step of aging the primary charged secondary battery at a high temperature (S300); and a room temperature aging step of aging the secondary battery aged at the high temperature (S400), wherein the room temperature aging step includes a resetting process of charging at a same charge rate as the SOC of the primary charging step.

In an embodiment of the present invention, the resetting process may include charging at a C-rate of 0.01 C to 1.0 C, and more preferably, charging at a C-rate of 0.05 C to 0.4 C.

In an embodiment of the present invention, the high temperature aging step (S300) includes aging the battery at a temperature of 60° C. or higher.

In an embodiment of the present invention, the high temperature aging step (S300) includes aging the battery for 12 to 48 hours.

In an embodiment of the present invention, the primary charging step (S200) includes charging to 65% to 75% of the secondary battery capacity (SOC).

In an embodiment of the present invention, the room temperature aging step (S400) includes determining a secondary battery having a low voltage failure from a voltage drop amount by measuring a change in a voltage value while aging the secondary battery.

At this time, the measuring of the change in the voltage value includes measuring a voltage value V1 at a starting point of a room temperature aging and measuring a voltage value V2 at an ending point of a room temperature aging, and then determining whether a voltage drop (V1-V2), which is a difference between the voltage value at the starting point and the voltage value at the ending point, satisfies a reference value range condition.

In an embodiment of the present invention, the method further includes a secondary charging step of charging the secondary battery at a C-rate of 0.1 to 2.0 C after the room temperature aging step (S400).

In an embodiment of the present invention, the pre-aging step (S100) includes aging the secondary battery by leaving the secondary battery for 0.5 to 72 hours in a temperature environment of 20° C. to 30° C.

The present invention also provides a method of manufacturing a secondary battery including the method of activating the secondary battery.

Advantageous Effects

The activation method of the present invention forms a negative electrode SEI film uniformly and stably by primary charging, accelerates SEI film stabilization through high temperature aging, and reduces the voltage drop of good products.

In addition, the activation method of the present invention includes a resetting process of recharging up to the charge rate (SOC) at the time of the primary charging, thereby reducing the deviation in the amount of voltage drop of the good product, thereby improving the detection power of low voltage failure.

Accordingly, according to these aspects of the present invention, it is possible to prevent a defective secondary battery from being distributed or used by detecting a secondary battery having high possibility of a low voltage defect early, and it is possible to prevent problems such as failure, damage or ignition of the secondary battery during the use of the secondary battery.

BRIEF DESCRIPTION OF THE DRAWINGS

FIG. 1 is a schematic diagram showing a conventional activation method.

FIG. 2 is a schematic diagram showing an activation method according to an embodiment of the present invention.

FIG. 3 is a schematic diagram showing steps of the activation method of the present invention.

DETAILED DESCRIPTION OF THE PREFERRED EMBODIMENTS

Hereinafter, preferred embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

FIG. 2 schematically shows step-by-step process conditions of an activation method according to an embodiment of the present invention, and FIG. 3 shows steps of an activation method according to an embodiment of the present invention. Referring to these drawings, an activation method of a secondary battery of the present invention includes: a pre-aging step of aging a secondary battery including a positive electrode containing a positive electrode active material, a negative electrode containing a negative electrode active material, a separator interposed between the positive electrode and the negative electrode, and an electrolyte, at a room temperature (S100); a primary charging step of charging the pre-aged secondary battery to 60% or more of a secondary battery capacity (SOC) (S200); a high temperature aging step of aging the primary charged secondary battery at a temperature of 60° C. or higher (S300); and a room temperature aging step of aging the high temperature aging secondary battery at a room temperature (S400), in which the room temperature aging step includes a resetting step of charging at the same charge rate (SOC) as the primary charging step.

The inventors of the present invention have reached the present invention as they have found that in the case of including the process of charging the secondary battery at the same charging rate as in the primary charging step during the room temperature aging process, not only the amount of voltage drop of good products decreases in the secondary battery, but also the deviation thereof also decreases in the secondary battery, so that the low voltage detection power is remarkably improved when selecting low voltage failure batteries.

First, the pre-aging step (S100) will be described. The pre-aging step (S100) is a step of aging the battery so that the electrolyte solution is sufficiently impregnated in the electrode and the separator after assembly of the battery.

More specifically, when the secondary battery is charged, if the electrons move to the negative electrode and charged, lithium ions are intercalated to the negative electrode to achieve charge neutrality. At this time, lithium ions can be occluded at the site where the electrolyte is impregnated, that is, where the ion migration path is maintained (wetting area), but occlusion is relatively difficult at the electrolyte non-wetting area.

Therefore, through the pre-aging step, the battery can be aged for 0.5 to 72 hours at room temperature and atmospheric pressure so that the electrolyte can be permeated into the positive and negative electrodes. For example, the pre-aging step may be performed at 20° C. to 30° C., specifically 22° C. to 28° C., more specifically 23° C. to 27° C., and even more specifically 25° C. to 27° C.

The activation process of the present invention is performed on a lithium secondary battery. This lithium secondary battery is assembled through the following process and then undergoes the pre-aging step.

An electrode mixture including an electrode active material and a binder is applied to an electrode current collector to prepare a positive electrode and a negative electrode, respectively, and then an electrode assembly is prepared by interposing a separator between the positive electrode and the negative electrode.

After the electrode assembly thus prepared is accommodated in a battery case, an electrolyte is injected, and the battery case is sealed to assemble a battery.

The step of assembling such a battery is not particularly limited and can be performed according to a known method.

In addition, the electrode assembly is not particularly limited as long as it is a structure including a positive electrode, a negative electrode, and a separator interposed between the positive electrode and the negative electrode, and may be, for example, a jelly-roll type, a stack type, or a stack/folding type.

The battery case is not particularly limited as long as it is used as an exterior material for packaging the battery, and a cylindrical, square, or pouch type may be used.

The electrolyte includes an organic solvent and a lithium salt, and may optionally further contain an additive.

The organic solvent is not limited as long as decomposition by an oxidation reaction or the like during charging and discharging of the battery can be minimized, and may be, for example, cyclic carbonate, linear carbonate, ester, ether, or ketone. These may be used alone, or two or more of them may be used in combination.

Among the organic solvents, carbonate-based organic solvents can be preferably used. Examples of cyclic carbonates include ethylene carbonate (EC), propylene carbonate (PC) and butylene carbonate (BC). Linear carbonates include dimethyl carbonate (DMC), diethyl carbonate (DEC), dipropyl carbonate (DPC), ethyl methyl carbonate (EMC), methylpropyl carbonate (MPC), and ethylpropyl carbonate (EPC).

Lithium salts commonly used in electrolytes of lithium secondary batteries such as $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$ and $LiClO_4$, etc. can be used for the lithium salt without limitation, and these can be used alone, two or more can be used in combination.

In addition, the electrolyte may optionally further include an additive. Any one or a mixture of two or more selected from a group consisting of vnylene carbonate, vinylethylene carbonate, fluoroethylene carbonate, cyclic sulfite, saturated sultone, unsaturated sultone, acyclic sulfone, lithium oxalyl difluoroborate (LiODFB), and derivatives thereof may be used as the additive in order to stably form an SEI film, but not limited thereto.

The cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, etc. Saturated sultone may include 1,3-propane sultone and 1,4-butane sultone, etc. Unsaturated sultone may include ethene sultone, 1,3-propene sultone, 1,4-butene sultone, and 1-methyl-1,3-propene sultone. The acyclic sulfone may include divinyl sulfone, dimethyl sulfone, diethyl sulfone, methylethyl sulfone, and methylvinyl sulfone.

These additives are added to the electrolyte to improve low temperature output characteristics by forming a solid SEI film on the negative electrode, as well as to suppress decomposition of the positive electrode surface and prevent oxidation reaction of the electrolyte during high temperature cycle operation.

When the battery case is of a pouch type, an aluminum laminated pouch including an aluminum layer may be used. After the electrolyte is injected, the opened portion of the aluminum laminated pouch can be sealed by heat welding.

Next, a primary charging step (S200) of charging the pre-aged secondary battery to 60% or more of the secondary battery capacity (SOC) is performed.

The primary charging step S200 is a step of forming a solid electrolyte interface (hereinafter referred to as "SEI") film layer, and in the present invention, the primary charge is characterized by charging the battery to 60% or more of the designed capacity (SOC).

In order to improve the detection power of low voltage failure battery, it is advantageous as the voltage drop of good products decreases and the voltage drop of defective products increases. In order to reduce the voltage drop of a good quality secondary battery and improve the dispersion, the SEI film of the negative electrode should be formed uniformly and stably, which can be achieved only when the volume of the negative electrode is expanded to the maximum. In the first charging step, when initially charged to 60% or more of the battery design capacity (SOC), the SEI film is formed as uniformly as possible to thereby reduce the voltage drop of the good product. Therefore, at the primary charging step, if the charging is perform at less than 60% of SOC, it may be difficult to achieve the object of the present invention, which is not preferable.

In one embodiment of the present invention, the charging amount of the charging step is preferably charged to 65% to 75% of the designed capacity (SOC) of the secondary battery.

Charging in the charging step (S200) may be performed according to the conditions known in the art.

In one embodiment of the present invention, the primary charging step (S200) may be performed at a charging end voltage of 3.0 to 4.0V and a C-rate of 1.0 C or less. However, in the case of such a charging end voltage, it may vary depending on the type or characteristic of the positive electrode active material.

In addition, the primary charging step (S200) may have a three-step process instead of a one-step process. Namely, the charging step may include a first charging section up to 10% of the secondary battery capacity (SOC), a second charging section up to 40% of the secondary battery capacity (SOC), and a third charging section of the subsequent section, and charging may be performed by setting different charging conditions for each of the three sections. At this time, the charging rate in the second charging section is preferably 0.5 C or less.

In a preferred embodiment of the present invention, the charging rate in the second charging section is preferably higher than the charging rate in the first charging section and the charging rate in the third charging section. At this time, the ratio of the charging rate in the first charging section and the charging rate in the third charging section is more preferably 2:3 to 3:2.

For example, the primary charging step S200 may be performed at a rate of 0.2 C up to 10% of the secondary battery capacity (SOC), at a rate of 0.25 C up to 40% of the secondary battery capacity (SOC), and at a rate of 0.2 C up to 65% of the secondary battery (SOC).

Further, the primary charging step (S200) may be performed at 20° C. to 30° C., specifically 22° C. to 28° C., more specifically 23° C. to 27° C.

Thereafter, a high temperature aging step (S300) of aging the primary charged battery in a high temperature environment is performed.

The high temperature aging step (S300) is a step of stabilizing the SEI film formed in the charging step earlier, and the stabilization of the SEI film is further accelerated through high temperature aging to reduce the amount of voltage drop of good products in the defective inspection aging section described later.

Particularly, in the present invention, the high-temperature aging step is performed at a high temperature of 60° C. or higher, preferably 65° C. to 75° C., thereby accelerating stabilization of the SEI film and reducing the amount of self-discharge of good products to improve low voltage detection. When the high temperature aging is performed at a temperature of less than 60° C., it is difficult to achieve the object of the present invention, and when the temperature is too high, there is a problem that battery performance, such as capacity and life, is deteriorated.

In one embodiment of the present invention, the high-temperature aging step may be performed for 12 hours to 48 hours, more preferably 18 hours to 36 hours. If the high temperature aging time is less than 12 hours, the stabilization of the SEI film may not be sufficient to achieve the object of the present invention, and when the high temperature aging time exceeds 48 hours, the aging time is prolonged, which is undesirable in terms of productivity.

Thereafter, a room temperature aging step (S400) of aging the high temperature aged secondary battery at room temperature is performed. Th room temperature aging step may be performed at 20° C. to 30° C., specifically 22° C. to 28° C., more specifically 23° C. to 27° C., and even more specifically 25° C. to 27° C.

The present invention includes a step of recharging the battery to the same charge rate (SOC) as in the primary charging in the room temperature aging step (S400) in order to minimize the variation in the amount of voltage drop due to self-discharge of the good product.

This is referred to as resetting charging for convenience.

The resetting charging may be performed simultaneously with the start of room temperature aging, but may also be performed within 12 hours from the start of room temperature aging.

The resetting charging is to perform charging at a C-rate of 0.01 C to 1.0 C or less, preferably at a C-rate of 0.05 C to 0.4 C. In case of charging at a C-rate exceeding 1.0 C, the effect of reducing the deviation of the voltage drop is insufficient, which is not preferable.

Further, the room temperature aging step (S400) may include measuring a change in voltage value while aging the secondary battery. This may be configured to determine whether the secondary battery has a low voltage defect by using the open circuit voltage (OCV) measured at different time points. For example, a high temperature aged secondary battery is stored at room temperature, but OCV is measured at least at two time points. And by comparing the difference value between respective OCVs with a reference value stored in advance in the memory unit or the like, it is possible to select whether the secondary battery has a low voltage defect.

In one embodiment of the present invention, the selection of whether the secondary battery has a low voltage defect is performed by measuring the voltage value V1 at the starting point of aging at room temperature and measuring the voltage value V2 at the ending point of aging at room temperature, and then determining whether the voltage drop (V1-V2), which is the difference between the start and end voltage values, satisfies the reference value range condition.

More specifically, when the voltage drop amount measurement value of the secondary battery to be inspected is 20 mV, and the reference value of the voltage drop amount of the good product is 10 mV, the measured voltage drop amount is greater than the reference value, so such a secondary battery can be judged as having a low voltage defect.

The activation method of the present invention may further include a secondary charging step of charging the secondary battery at a rate of 0.1 to 2.0 C after the normal temperature aging step (S400).

In addition, since the side reaction gas generated inside the secondary battery by the charging step and the high temperature aging step may cause a swelling phenomenon of the battery, the activation method of the present invention may further include a degassing process of removing such side reaction gases.

In the degassing process, various degassing techniques known at the time of filing the present invention can be employed. For example, the degassing process may be performed by cutting an extended portion and sealing the cut portion in a pouch-type secondary battery having one side extended. However, since such a degassing technique is widely known to those skilled in the art, a more detailed description is omitted here.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Preparation Example

A positive electrode mixture was prepared by mixing 96.7 parts by weight of Li [$Ni_{0.6}Mn_{0.2}Co_{0.2}$]$O_2$ serving as a positive electrode active material, 1.3 parts by weight of graphite serving as a conductive material, and 2.0 parts by weight of polyvinylidene fluoride (PVdF) serving as a binder. The positive electrode mixture slurry was prepared by dispersing the obtained positive electrode mixture in 1-methyl-2-pyrrolidone functioning as a solvent. A positive electrode was prepared by coating, drying, and pressing the slurry on both sides of an aluminum foil having a thickness of 20 μm, respectively.

A negative electrode mixture was prepared by mixing 97.6 parts by weight of artificial graphite and natural graphite that function as negative electrode active materials (weight ratio: 90:10), 1.2 parts by weight of styrene-butadiene rubber (SBR) that functions as a binder, and 1.2 parts by weight of carboxymethyl cellulose (CMC). The negative electrode mixture slurry was prepared by dispersing the negative electrode mixture in ion-exchanged water functioning as a solvent. A negative electrode was prepared by coating, drying, and pressing the slurry on both sides of an copper foil having a thickness of 20 μm.

A non-aqueous electrolyte solution was prepared by dissolving $LiPF_6$ in an organic solvent, in which ethylene carbonate (EC), propylene carbonate (PC), and diethyl carbonate (DEC) were mixed in a composition of 3:3:4 (volume ratio). Herein, $LiPF_6$ was dissolved in the organic solvent to be a concentration of 1.0M.

A lithium secondary battery was prepared by laminating a porous polyethylene separator between the positive electrode and the negative electrode prepared above and storing them in a pouch, and then injecting the electrolyte.

Example 1

20 secondary batteries of Preparation Example were prepared, aged at room temperature of 25° C. for 24 hours, and pre-aged. The pre-aged secondary batteries were charged at a rate of 0.2 C to a SOC of 65%, completing the primary charging. After the primary charged battery was subjected to high-temperature aging at a temperature of 60° C. for 24 hours, aging was performed at room temperature for 4 days at a room temperature of 25° C. At this time, after 3 hours from the start of room temperature aging, a resetting process of recharging to 65% SOC at a C-rate of 0.1 C was performed.

Example 2

In Example 1, the activation process was performed in the same manner as in Example 1, except that the C-rate during the resetting process was changed to 0.3 C.

Example 3

In Example 1, the activation process was performed in the same manner as in Example 1, except that the C-rate during the resetting process was changed to 0.5 C.

Example 4

In Example 1, the activation process was performed in the same manner as in Example 1, except that the C-rate during the resetting process was changed to 0.7 C.

Example 5

In Example 1, the activation process was performed in the same manner as in Example 1, except that the C-rate during the resetting process was changed to 1.0 C.

Comparative Example 1

20 secondary batteries of Preparation Example were prepared, aged at room temperature of 25° C. for 24 hours, and pre-aged. The pre-aged secondary batteries were charged at a rate of 0.2 C to a SOC of 17%, completing the primary charging. Thereafter, high-temperature aging was performed at a temperature of 65° C. for 24 hours, and secondary charging was performed with a C-rate of 0.2 C up to 100% SOC, and then room temperature aging was performed at room temperature of 25° C. for 48 hours.

Comparative Example 2

In Example 1, the activation process was performed in the same manner as in Example 1, except that the resetting process was not performed during room temperature aging.

Experimental Example: Measurement of Voltage Drop

In the case of Examples 1 to 5, the open circuit voltage (V1) of the secondary battery was measured at the time point of completing the resetting process, and the open circuit voltage (V2) of the secondary battery was measured at the time point of completing the room temperature aging, to thereby deriving the voltage drop amount ($\Delta OCV = V1 - V2$). In addition, the average and standard deviation of the voltage drop of each of the 20 batteries were calculated, and the results are shown in Table 1.

In the case of Comparative Example 1 and Comparative Example 2, the open circuit voltage (V1) of the secondary battery was measured At the time point of starting room temperature aging, and the open circuit voltage (V2) of the secondary battery was measured at the time point of completing the room temperature aging, to thereby deriving the voltage drop amount ($\Delta OCV = V1 - V2$). In addition, the average and standard deviation of the voltage drop of each of the 20 batteries were calculated, and the results are shown in Table 1.

TABLE 1

| | Voltage drop amount (mV) | |
| --- | --- | --- |
| | Average | Standard deviation |
| Example 1 | 6.74 | 0.10 |
| Example 2 | 6.65 | 0.13 |
| Example 3 | 6.52 | 0.47 |
| Example 4 | 6.76 | 0.44 |
| Example 5 | 6.65 | 0.43 |
| Comparative Example 1 | 57.74 | 1.71 |
| Comparative Example 2 | 6.64 | 0.75 |

Referring to Table 1, when comparing the batteries manufactured by the activation method according to the Example of the present invention with the batteries manufactured by the activation method according to Comparative Example 1, the voltage drop amount of the batteries of the Example was much smaller than that of the batteries of Comparative Example 1, and the standard deviation of the voltage drop amount of the good product was also much smaller in the Example than in the Comparative Example 1, so that the dispersion was improved.

In addition, when comparing the batteries manufactured by the activation method according to the embodiment of the present invention with the batteries of Comparative Example 2 without performing the resetting process, the voltage drop amounts of both were at similar levels, but the standard deviation of the amount of voltage drop was larger in the batteries of Comparative Example 2. Accordingly, it can be said that the activation method of the present invention including the resetting process has an excellent effect of improving the dispersion of the voltage drop amount. In addition, in the resetting process, Examples 1 to 2 charged with a C-rate of 0.3 C or less were better in dispersion of the voltage drop than Examples 3 to 5 charged with a C-rate of 0.5 C or more. Therefore, in the activation method of the present invention, it can be evaluated that it is more preferable to charge with a C-rate of less than 0.5 C during the resetting process.

As described above, in the present specification and drawings, preferred embodiments of the present invention have been disclosed. Further, although specific terms are used, they are merely used in a general sense to easily describe the technical content of the present invention and to help understand the present invention, and are not intended to limit the scope of the present invention. It is apparent to those skilled in the art to which the present invention pertains that other modified examples based on the technical spirit of the present invention can be implemented in addition to the embodiments disclosed herein.

The invention claimed is:

1. A method for activating a secondary battery, the method comprising:
   a pre-aging step of aging a secondary battery including a positive electrode containing a positive electrode active material, a negative electrode containing a negative electrode active material, a separator interposed between the positive electrode and the negative electrode, and an electrolyte, at a room temperature to provide a pre-aged secondary battery;
   a primary charging step of charging the pre-aged secondary battery to 60% or more of a secondary battery state of charge (SOC) to provide a primary charged secondary battery;
   a high temperature aging step of aging the primary charged secondary battery at a high temperature to provide a high-temperature aged secondary battery; and
   a room temperature aging step of aging the high-temperature aged secondary battery at a room temperature to provide a room temperature aged battery,
   wherein the room temperature aging step includes a resetting process of charging the room temperature aged battery to the SOC of the primary charging step.

2. The method of claim 1, wherein the resetting process includes charging at a C-rate of 0.01 C to 1.0 C.

3. The method of claim 1, wherein the resetting process includes charging at a C-rate of 0.05 C to 0.4 C.

4. The method of claim 1, wherein the high temperature aging step includes aging the primary charged secondary battery at a temperature of 60° C. or higher.

5. The method of claim 1, wherein the high temperature aging step includes aging the primary charged secondary battery for 12 hours to 48 hours.

6. The method of claim 1, wherein the primary charging step includes charging to 65% to 75% of the secondary battery state of charge (SOC).

7. The method of claim 1, wherein the room temperature aging step includes determining a secondary battery having a low voltage failure from a voltage drop amount by measuring a change in a voltage value while aging the secondary battery.

8. The method of claim 7, wherein the measuring of the change in the voltage value includes measuring a voltage value V1 at a starting point of the room temperature aging step and measuring a voltage value V2 at an ending point of the room temperature aging step, and then determining whether a voltage drop (V1–V2), which is a difference between the voltage value at the starting point and the voltage value at the ending point, satisfies a reference value range condition.

9. The method of claim 1, further comprising: a secondary charging step of charging the secondary battery at a C-rate of 0.1 to 2.0 C after the room temperature aging step.

10. The method of claim 1, wherein the pre-aging step includes aging the secondary battery by leaving the secondary battery for 0.5 hours to 72 hours in a temperature environment of 20° C. to 30° C.

11. A method of manufacturing a secondary battery including the method of claim 1.

* * * * *